United States Patent
Lindner et al.

(10) Patent No.: US 10,890,107 B2
(45) Date of Patent: Jan. 12, 2021

(54) EXHAUST-GAS TURBO CHARGER FOR AN INTERNAL COMBUSTION ENGINE, AND METHOD FOR PRODUCING AN EXHAUST-GAS TURBOCHARGER

(71) Applicant: AUDI AG, Ingolstadt (DE)

(72) Inventors: Marko Lindner, Kipfenberg (DE);
Franz Bäumel, Kipfenberg (DE);
Maximilian Köhnlein, Ingolstadt (DE);
Dominik Simon, Krombach (DE)

(73) Assignee: Audi AG, Ingolstadt (DE)

( * ) Notice: Subject to any disclaimer, the term of this patent is extended or adjusted under 35 U.S.C. 154(b) by 142 days.

(21) Appl. No.: 15/522,153

(22) PCT Filed: Oct. 24, 2015

(86) PCT No.: PCT/EP2015/002116
§ 371 (c)(1),
(2) Date: Apr. 26, 2017

(87) PCT Pub. No.: WO2016/066255
PCT Pub. Date: May 6, 2016

(65) Prior Publication Data
US 2018/0291800 A1 Oct. 11, 2018

(30) Foreign Application Priority Data

Oct. 27, 2014 (DE) .................. 10 2014 015 882

(51) Int. Cl.
*F02B 37/18* (2006.01)
*F01D 17/10* (2006.01)
*F16K 5/06* (2006.01)

(52) U.S. Cl.
CPC .......... *F02B 37/183* (2013.01); *F01D 17/105* (2013.01); *F16K 5/0647* (2013.01); *F05D 2220/40* (2013.01); *Y02T 10/12* (2013.01)

(58) Field of Classification Search
CPC ...... F02B 37/18; F02B 37/183; F02B 37/186; Y02T 10/144; F16K 5/0647; F05D 2220/40
(Continued)

(56) References Cited

U.S. PATENT DOCUMENTS 2,459,682 A * 1/1949 Carrie .................. F16K 5/162
251/163
2,872,155 A * 2/1959 Hazard .................. F16K 5/162
251/165

(Continued)

FOREIGN PATENT DOCUMENTS

CN 201818824 U * 5/2011
CN 206274084 U * 6/2017
(Continued)

OTHER PUBLICATIONS

CN201818824 English Translation.*
International Search Report issued by the European Patent Office in International Application PCT/EP2015/002116.

*Primary Examiner* — Thai Ba Trieu
(74) *Attorney, Agent, or Firm* — Henry M. Feiereisen LLC

(57) ABSTRACT

An exhaust gas turbocharger for an internal combustion engine, includes a turbine; a bypass line fluidly arranged parallel to the turbine; and a cross section adjustment element for adjusting a flow cross section of the bypass line, wherein the cross section adjustment element being configured as a ball valve having a valve housing, two bearing shells arranged in the valve housing and a valve element. The valve element is floatingly supported in the valve housing and arranged between the two bearing shells with a tolerance in a direction which is angled with respect to a rotation axis of the valve element.

13 Claims, 4 Drawing Sheets

(58) Field of Classification Search
USPC ....... 60/602; 251/315.08, 315.1, 315.14, 366
See application file for complete search history.

(56) References Cited

U.S. PATENT DOCUMENTS

| | | | | |
|---|---|---|---|---|
| 3,157,380 | A * | 11/1964 | Sivyer | F16K 5/204 251/163 |
| 3,167,300 | A * | 1/1965 | Kaiser | 251/315.14 |
| 3,228,652 | A * | 1/1966 | Antrim | F16K 5/0642 251/315.14 |
| 3,480,253 | A * | 11/1969 | Davies | F16K 5/0626 251/174 |
| 3,584,641 | A * | 6/1971 | Milleville | F16K 5/0673 251/315.08 |
| 3,685,793 | A * | 8/1972 | Szumilas | F16K 5/162 251/312 |
| 4,147,326 | A * | 4/1979 | Natalizia | F16K 5/0636 251/162 |
| 4,231,545 | A * | 11/1980 | Nelimarkka | F16K 5/0694 251/161 |
| 4,637,421 | A * | 1/1987 | Stunkard | F16K 5/0636 251/315.08 |
| 4,750,708 | A * | 6/1988 | Yusko, Jr. | F16K 5/0678 251/174 |
| 4,762,301 | A * | 8/1988 | Wozniak | F16K 5/0642 251/315.14 |
| 4,911,409 | A * | 3/1990 | Oliver | F16K 5/0642 251/315.14 |
| 5,081,842 | A * | 1/1992 | Sugiyama | F02B 37/007 60/600 |
| 5,313,976 | A * | 5/1994 | Beasley | F16K 5/0636 137/15.22 |
| 5,374,030 | A * | 12/1994 | Guest | F16K 5/162 251/165 |
| 5,927,687 | A * | 7/1999 | Krause | F16K 5/0689 251/315.08 |
| 6,637,455 | B1 * | 10/2003 | Tappe | F16K 27/067 251/366 |
| 6,899,079 | B1 | 5/2005 | Hill et al. | |
| 7,971,855 | B2 * | 7/2011 | Burgess | F16K 5/20 251/315.1 |
| 8,695,570 | B2 | 4/2014 | Lindner et al. | |
| 9,388,784 | B2 | 7/2016 | Lindner et al. | |
| 10,012,317 | B2 * | 7/2018 | Sucher | F16K 5/0605 |
| 10,393,275 | B2 * | 8/2019 | Patil | F16K 5/0207 |
| 2005/0087171 | A1 | 4/2005 | Lown | |
| 2008/0208432 | A1 | 8/2008 | Hu | |
| 2010/0243938 | A1 * | 9/2010 | Sumiya | F16K 5/201 251/315.1 |
| 2010/0327205 | A1 * | 12/2010 | Tan | F16K 5/0668 251/315.01 |
| 2011/0000209 | A1 | 1/2011 | Boening et al. | |
| 2012/0085321 | A1 | 4/2012 | Lindner et al. | |
| 2012/0201655 | A1 * | 8/2012 | Kusakabe | F01D 9/026 415/116 |
| 2015/0240656 | A1 | 8/2015 | Ehrhard et al. | |
| 2017/0343118 | A1 * | 11/2017 | Balan | F16K 5/0694 |

FOREIGN PATENT DOCUMENTS

| | | | | |
|---|---|---|---|---|
| DE | 608 722 A | | 1/1935 | |
| DE | 3144464 A1 | * | 5/1983 | ........... F16K 5/0647 |
| DE | 3514172 A1 | * | 10/1986 | ............... B67D 1/12 |
| DE | 10 2008 011 416 A1 | | 9/2009 | |
| DE | 10 2012 110 873 A1 | | 5/2014 | |
| DE | 10 2012 112 396 A1 | | 7/2014 | |
| EP | 1 203 872 A1 | | 5/2002 | |
| EP | 2 236 872 A1 | | 10/2010 | |
| GB | 2 446 916 A | | 8/2008 | |
| GB | 2524257 A | * | 9/2015 | ........... F02B 37/183 |
| JP | 49055122 U | * | 5/1974 | |
| JP | 51030016 U | * | 3/1976 | |
| JP | 03255277 A | * | 11/1991 | |
| JP | 06016774 U | * | 3/1994 | |
| JP | 06018771 U | * | 3/1994 | |
| JP | 2008208984 A | * | 9/2008 | |
| NL | 7 606 882 A | | 1/1977 | |

\* cited by examiner

EXHAUST-GAS TURBO CHARGER FOR AN INTERNAL COMBUSTION ENGINE, AND METHOD FOR PRODUCING AN EXHAUST-GAS TURBOCHARGER

CROSS-REFERENCES TO RELATED APPLICATIONS

This application is the U.S. National Stage of International Application No. PCT/EP2015/002116, filed Oct. 24, 2015, which designated the United States and has been published as International Publication No. WO 2016/066255 and which claims the priority of German Patent Application, Serial No. 10 2014 015 882.9, filed Oct. 27, 2014, pursuant to 35 U.S.C. 119(a)-(d).

BACKGROUND OF THE INVENTION

The invention relates to an exhaust gas turbocharger for an internal combustion engine with a turbine, a bypass line fluidly arranged parallel to the turbine and a cross section adjustment element for adjusting a flow cross section of the bypass line. The invention also relates to a method for producing an exhaust gas turbocharger.

The internal combustion engine serves for example for driving a motor vehicle, i.e., for providing a torque directed toward driving the motor vehicle. The internal combustion engine can insofar be a component of the motor vehicle. The internal combustion engine has the exhaust gas turbocharger. The exhaust gas turbocharger serves for providing air, in particular fresh air, at a pressure level above the pressure level of an external environment of the internal combustion engine.

During operation of the internal combustion engine the exhaust gas generated by the internal combustion engine is supplied to the exhaust gas turbocharger or the turbine of the exhaust gas turbocharger. The exhaust gas flows through or over the turbine, wherein enthalpy or flow energy contained in the exhaust gas is converted into kinetic energy. The kinetic energy is then used for driving a compressor of the exhaust gas turbocharger. By means of the compressor air is suctioned in, in particular from the external environment, and is compressed, i.e., brought to a higher pressure level. The compressed air is then supplied to the internal combustion engine. In this way the power and/or efficiency of the internal combustion engine can be improved.

However, it may not be useful to always conduct the entire generated exhaust gas through the turbine in every operating state of the internal combustion engine. For this reason the bypass line is provided fluidly parallel to the turbine through which bypass line the exhaust gas can bypass the turbine. Assigned to the bypass line is the cross section adjustment element by means of which the flow cross section of the bypass line can be adjusted, preferably continuously.

From the state of the art for example the reference EP 2 236 872 A1 is known. This reference relates to an exhaust gas return valve which has a valve housing and a bail-valve body.

SUMMARY OF THE INVENTION

It is an object of the invention to provide an exhaust gas turbocharger for an internal combustion engine which has advantages compared to the state of the art, and in particular enables a reliable sealing and simple mounting.

This is achieved according to the invention with an exhaust gas turbocharger with the features of the independent claim relating to the exhaust gas turbocharger. Hereby it is provided that the cross section adjustment element is configured as a ball valve and that a valve element of the ball valve is swimmingly supported in a valve housing and arranged between two bearing shells which are also provided in the valve housing. The cross section adjustment element is configured as a ball valve. This means that the valve element of the ball valve is spherical or ball shaped at least in regions, wherein the desired flow cross section of the bypass line can be adjusted by a rotary movement of the valve element.

The valve element of the ball valve is floatingly supported in the valve housing. This means that the valve element is not only arranged for rotation in the valve housing but tolerance in at least one further direction exists, i.e., the valve element has a certain freedom of movement. The tolerance is for example is present in a direction which is angled compared to a rotation axis, i.e., it encloses an angle of greater than 0° and smaller than 180° with the rotation axis.

The valve element is arranged between the bearing shells which are also arranged in the valve housing. At at least one of the bearing shells preferably a valve seat is present with which the valve element interacts for adjusting the flow cross section of the bypass line. Depending on an adjustment of a rotary angle of the valve element relative to bearing shell, which is provided as valve seat, the flow cross section can thus be completely blocked, partially released or completely released. Due to the swimming support of the valve element the valve element can—in particular when the flow cross section is at least partially or fully blocked—be urged or displaced by the exhaust gas in the direction of the valve seat or into the valve seat. Thus a self sealing of the ball valve is realized ensuring a reliable blocking, in particular a complete blocking, also in the event of wear.

Furthermore, the bearing shells can be provided for providing end stops for the valve element. In particular the valve element is hereby arranged with a tolerance between the bearing shells. This in particular means that the valve element always contacts at most one of the bearing shells while being arranged spaced apart from the respective other bearing shell or is at least not in contact with the other bearing shell. Of course it can also be provided that the valve element is arranged so that it does not contact either of the bearing shells but is situated between the bearing shells.

Advantageously the bearing shells each have a partially spherical receiving opening for the valve element. As explained above the valve element is at least partially, in particular completely, spherical. The bearing shells have complementary receiving openings which are partially spherical and are insofar configured for receiving a part of the valve element.

The valve element preferably has a central flow channel while each of the bearing shells has a flow passage which in particular has the same flow cross section as the flow channel. The flow passage of one of the bearing shells is fluidly arranged with a flow inlet of the cross sectional element and the flow inlet of the other one of the bearing shell with a flow outlet directly fluidly.

In at least one rotary angular position of the valve element the flow cross section of the flow channel is in flow communication with the flow passages of the bearing shells. Correspondingly fluid can flow from the flow inlet in the direction of the flow outlet, wherein the fluid flows through the flow passages and the flow cross section. Particular preferably in at least one rotary angular position of the valve element the flow cross section is aligned with both flow passages of the bearing shell so that a minimal flow resistance is realized. This is in particular achieved in that the flow channel has the same flow cross section as the flow passages.

Advantageously at least one of the bearing shells is made of an elastic material. In particular this is the bearing shell on which the valve seat of the cross sectional element is present with which the valve element interacts for adjusting the flow cross section of the bypass line. Particularly preferably however both bearing shells are made of elastic material. By means of the elastic material vibrations of the valve element and noise resulting therefrom can be reduced or completely reduced. Further the sealing effect of the cross section adjustment element is significantly improved so that the bypass line can also be completely closed.

In a preferred embodiment of the invention it is provided that the valve housing has a mounting opening through which the valve element and the two bearing shells can be inserted together into the valve housing. As mentioned above the bearing shells each have a receiving opening for the valve element. The receiving opening can be configured partially spherical. For mounting the exhaust gas turbocharger the valve element is arranged in the receiving openings of the bearing shells. Subsequently the bearing shells together with the valve element are inserted into the valve housing through the mounting opening. The mounting opening insofar has corresponding dimensions.

Such an configuration of the valve housing ensures a simple mounting because the bearing shells and the valve element can be placed in a single work step. In particular a receptacle for the arrangement of valve element and bearing shells is provided in the valve housing, which receptacle is configured so that the bearing shells and the valve element are securely held in the receptacle after insertion through the mounting opening into the receptacle so that removal of the arrangement is only possible through the mounting opening however no displacement in any other direction.

An embodiment of the invention provides that the mounting opening is closed by a lid in which a through opening for an adjustment shaft, which is operatively connected with the valve element, is formed. After insertion of the arrangement of valve element and bearing shells through the mounting opening into the receptacle the mounting opening is closed with the lid. In order to enable actuation or displacement of the valve element the adjustment shaft is provided which is operatively connected with the valve element.

In the lid the through opening is provided through which the adjustment shaft protrudes out of the valve housing. On the side of the adjustment shaft, which faces away from the valve element preferably an actuating device is provided which can be of arbitrary construction. The actuating device can for example be electrical or pneumatic. The adjustment shaft is arranged in the through opening for rotation for example supported in the through opening for rotation.

In a further preferred embodiment of the invention the lid has at least one holding protrusion which contacts the bearing shells. After the mounting of the lid on the valve housing the holding protrusion rests against the bearing shells. For example multiple holding protrusions are provided, wherein preferably one of the holding protrusions is assigned to each of the bearing shells. The holding protrusion or the holding protrusions are configured to fix the bearing shell in the valve housing, i.e., to hold it in position, or to at least urge the bearing shell into the valve housing. The bearing shells are insofar held rigidly on or in the valve housing.

In a further embodiment of the invention it is provided that on the lid a bearing element is fastened in which a further through opening for the adjustment shaft is present. While the lid is fastened on the valve housing for example is screwed with the valve housing, the bearing element engages on the lid. Preferably the bearing element is exclusively fastened ion the lid and is insofar only indirectly connected with the valve housing. The bearing element is traversed by the adjustment shaft for which the bearing element has a further through opening. The adjustment shaft is insofar also arranged for rotation in the further through opening, in particular supported for rotation in the through opening.

In a further embodiment of the invention the though opening and/or the further through opening can have an inner diameter which is greater than the outer diameter of the adjustment shaft. The adjustment shaft is insofar not held in the through opening and/or the further through opening in radial direction with respect to its rotation axis but is rather arranged with a clearance. Such a configuration of the through opening or the further through opening in particular ensures the swimming support of the valve element in the valve housing. The valve element is insofar also not fixed via the adjustment shaft with respect to the valve housing, in particular not in radial direction with respect to the valve housing.

A particularly preferred embodiment of the invention provides that between the lid and the bearing element a bearing sleeve is arranged which engages about the adjustment shaft in circumferential direction and which in particular is in continuous sealing contact with the adjustment shaft in circumferential direction. The bearing sleeve is held between the lid and the bearing element. The bearing sleeve is for example provided in a receptacle of the lid, which receptacle is closed during mounting of the exhaust gas turbocharger by means of the bearing element. The bearing sleeve engages, preferably completely, about the adjustment shaft in circumferential direction with respect to its rotation axis. Hereby it can be provided that the bearing sleeve is in sealing contact with the adjustment shaft, in particular over the entire circumference of the adjustment shaft.

The bearing sleeve insofar serves for supporting the adjustment shaft with respect to the valve housing. However in order to still ensure the swimming support of the valve element the bearing sleeve preferably is made of a flexible, in particular elastic, material. While thus on one hand a sealing of the valve housing is realized by means of the bearing sleeve, the adjustment shaft is supported on the other hand with a clearance in radial direction with respect to the valve housing.

A further embodiment of the invention provides that the adjustment shaft is configured one-piece with and/or of the same material as the valve element. Particularly preferably the adjustment shaft is produced together with the valve element. As an alternative the adjustment shaft can of course also be produced separate from the valve element and can be subsequently joined with the valve element, for example by welding or the like. However what is important is that the adjustment shaft is rigidly connected with the valve element. It is also advantageous when the adjustment shaft is made of the same material and is therefore in material unity with the valve element.

In a further embodiment of the invention the valve housing is arranged in an exhaust gas line, to which a turbine outlet of the turbine is connected, wherein the exhaust gas line has a greater cross section than the valve housing; alternatively the valve housing can be integrated in a turbine housing of the turbine. The exhaust gas line serves for discharging exhaust gas from the turbine. Insofar the exhaust gas line adjoins a turbine outlet of the turbine or a turbine housing of the turbine. The exhaust gas which flows through the turbine is discharged by means of the exhaust gas line, in particular in the direction of the external environment. The valve housing is arranged so that it only blocks a small portion of the flow cross section of the exhaust gas line. Correspondingly the exhaust gas line is configured to have a greater cross section than the valve housing or has a flow cross section which is greater than the cross section of the valve housing. The exhaust gas coming out of the turbine insofar bypasses or circumvents the valve housing.

As an alternative the valve housing can be integrated in the turbine housing of the turbine. Preferably the valve housing is thus formed by a region of the turbine housing. Hereby also the bypass line is preferably situated at least partially, in particular completely, in the turbine housing. For example the bypass line connects at least one exhaust gas inlet connection of the turbine housing with an exhaust gas outlet connection to which in particular the exhaust gas line is connected. Preferably the cross section adjustment element or the ball valve together with its valve housing is situated in the turbine housing. Correspondingly the cross section adjustment element is arranged in the bypass line.

When the exhaust gas turbocharger is of single-branch construction only one exhaust gas inlet connection is present. When the exhaust gas turbocharger is of multi-branch construction each branch is assigned an exhaust gas inlet connection. Preferably the bypass line is in flow communication with all exhaust gas inlet connections. By means of the cross section adjustment element, which serves for adjusting the flow cross section, the portion of the exhaust gas can be adjusted that is conducted past the turbine, i.e. that flows through the bypass line from the at least one exhaust gas inlet connection to the exhaust gas outlet connection.

In a further embodiment of the invention it can be provided that the bypass line extends from the turbine into the exhaust gas line up to a flow inlet of the valve housing. The bypass line is connected upstream of the turbine. For this purpose a bypass connection is formed in the turbine housing, with which the bypass line is fluidly connected. The bypass line protrudes from the turbine or the turbine housing into the exhaust gas line up to the flow inlet of the valve housing. Preferably the flow inlet is hereby arranged in the exhaust gas line spaced apart from the turbine outlet of the turbine. In particular the distance in relation to an inner diameter of the exhaust gas line is at least 0.1, at least 0.25, at least 0.5, at least 0.75 or at least 1.0.

In a further embodiment of the invention it can be provided that the valve housing has a flow outlet which widens in a direction away from the valve element. The fluid flowing through the bypass line can exit through the flow outlet out of the valve housing. In particular the flow outlet is arranged in the exhaust gas line so that the exhaust gas that is conducted past the turbine mixes with the exhaust gas which flows through the turbine. Particularly preferably the flow outlet is configured as a diffuser, i.e., it widens in the direction away from the valve element or the turbine. This means that the flow cross section of the flow outlet increases in this direction, preferably continuously or constantly.

The invention also relates to a method for producing an exhaust gas turbocharger for an internal combustion engine, in particular an exhaust gas turbocharger according to the description above, wherein the exhaust gas turbocharger has a turbine, a bypass line provided fluidly in parallel to the turbine and a cross section adjustment element for adjusting the flow cross section of the bypass line. Hereby it is provided that the cross section adjustment element is constructed as a ball valve and that a valve element of the ball valve is supported floatingly in a valve housing and is arranged between two bearing shells that are also arranged in the valve housing.

The advantages of such a configuration of the internal combustion engine or such a method were mentioned above. The method and the internal combustion engine can be modified according to the description above so that reference is made thereto.

In particular it is provided within the scope of the method that the valve element and the two bearing shells are inserted together through the mounting opening of the valve housing into the valve housing or into the receptacle of the valve housing. Also preferably the mounting opening is subsequently closed by the lid. In this way a simple mounting of the exhaust gas turbocharger is ensured.

In the following the invention is explained in more detail by way of the exemplary embodiments shown in the drawing without limiting the invention. Hereby it is shown in:

BRIEF DESCRIPTION OF THE DRAWING

FIG. 1 shows a longitudinal sectional view through a region of an internal combustion engine 1, in particular through a region of an exhaust gas turbocharger 2. The exhaust gas turbocharger 2 has a turbine 3 with a turbine housing 4 and a turbine rotor or turbine impeller arranged in the turbine housing 4. On a turbine outlet 5 of the turbine housing 4 though which the exhaust gas flows out after flowing through the turbine 3, an exhaust gas line 6 is connected. The exhaust gas line 6 serves for discharging the exhaust gas for example in the direction of the external environment.

DETAILED DESCRIPTION OF PREFERRED EMBODIMENTS

Figure 1:
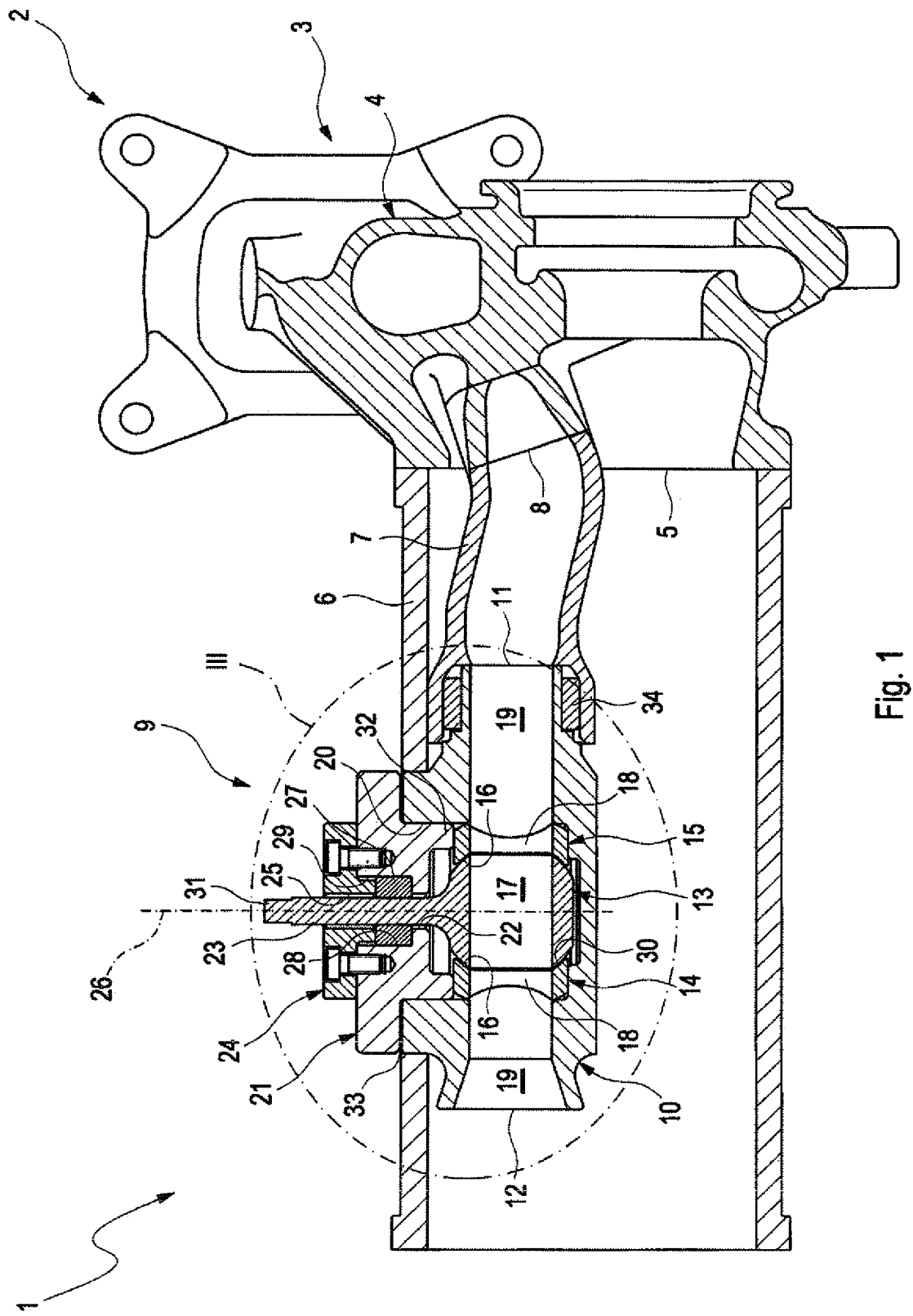
FIG. 1 a longitudinal section through an exhaust gas turbocharger for an internal combustion engine wherein in an exhaust gas line a cross section adjustment element for adjusting the flow cross section of a bypass line is arranged, FIG. 2 an exploded view of the cross section adjustment element, FIG. 3 a detail sectional view of the cross section adjustment element and FIG. 4 a longitudinal sectional view through an exhaust gas turbocharger in a further embodiment.

The turbine 3 further has a bypass line 7, which is for example connected to a bypass connection 8 of the turbine housing 4. The bypass line 7 or the bypass connection 8 are connected upstream of the turbine impeller and insofar are situated parallel to the turbine 3 or the turbine impeller. The exhaust gas conducted to the turbine 3, for example from the internal combustion engine 1, can insofar either flow through the turbine 3 or flow over the turbine impeller or as an alternative be conducted through the bypass line 7 past the turbine 3 or the turbine impeller.

Assigned to the bypass line 7 is a cross section adjustment element 9, which serves for adjusting the flow cross section of the bypass line 7. By means of the cross section adjustment element 9 the flow connection through the bypass line 7 can thus be blocked, partially released or fully released.

The cross section adjustment element 9 is constructed as a ball valve. It has a valve housing 10 which has a flow inlet 11 and a flow outlet 12. The flow inlet 11 is connected to the bypass line 7. For this purpose for example the valve housing 10 protrudes partially into the bypass line 7 or is surrounded by the bypass line as in the here shown exemplary embodiment. The cross section adjustment element 9 has a valve element 13 which is floatingly supported in the valve housing 10. On both sides adjacent the valve element 13 bearing shells 14 and 15 are arranged in the valve housing 10.

The valve element 10 is substantially spherical or ball shaped. The bearing shells 14 and 15 each have a receiving opening 16 into which the valve element 13 partially engages. The valve element 13 has a flow channel 17 which for example is formed centrally in the valve element and fully traverses the valve element. For example the flow channel 17 has a circular cross section. In the bearing shells a respective flow passage 18 is formed. The flow passage has preferably the same flow cross section as the flow channel 17 so that in at least one rotary angular position of the valve element 13 the flow passage 18 of the bearing shells 14 and 15 are arranged so as to align with the flow channel 17.

Preferably a flow channel 19 is also situated in the valve housing 10, which flow channel 19 is connected on one side to the flow inlet 11 and on the other side to the flow outlet 12. The flow channel 19 has preferably a constant flow cross section. In particular its flow cross section correspond to the flow cross section of the flow channel 17 or the flow passages 18. However, it can also be provided that the flow outlet 12 widens in the direction facing away from the valve element 13 so that the flow outlet 12 is configured as a diffuser. In the flow channel the valve element 13 and the bearing shells 14 and 15 are arranged.

It can be seen that the valve housing 10 has a mounting opening 20 through which the valve element 13 and the two bearing shells 14 and 15 can together be inserted into the valve housing 10. The mounting opening 20 has corresponding recesses. The mounting opening 20 is closed by means of a lid 21 which is preferably directly fastened on, in particular screwed to, the valve housing 10. In the lid 21 a through opening 22 is provided. In this through opening 21 an adjustment shaft 23 is arranged which is at least operatively connected with the valve element 13. Particularly preferably, however, the adjustment shaft 23 is configured one-piece with and/or of the same material as the valve element 13.

On the lid 21 a bearing element 24 is arranged, in particular fastened, preferably screwed to the lid 21. The bearing element 24 has a further through opening 25 through which the adjustment shaft 23 protrudes. Particularly preferably the through opening 22 and the through opening 25 have inner diameters that are greater than the outer diameter of the adjustment shaft 23. This means that the adjustment shaft 24 is supported floatingly in the through opening 22 and the through opening 25, i.e., it is not fully fixed in radial direction with respect to a rotation axis 26 of the adjustment shaft 23, but is rather supported with a clearance.

Between the lid 21 and the bearing element 24 a bearing sleeve 27 is arranged, preferably clampingly held between the lid 21 and the bearing element 24. With its outer circumference the bearing sleeve 27 preferably contacts a walling 28, for example recess 29, of the lid 21. In axial direction with respect to the rotation axis 26 the bearing sleeve 27 contacts the lid 21 and also the bearing element 24. In particular the baring element 24 hereby holds the bearing sleeve 27 in the recess 29. For this purpose the bearing element 24 for example protrudes into the recess 29. The bearing sleeve 27 completely engages about the adjustment shaft 23 in circumferential direction with respect to the rotation axis 26. In particular the bearing sleeve 27 contacts the adjustment shaft 23 in circumferential direction continuously, in particular sealingly. For this purpose the bearing sleeve 27 is for example made of an elastic material.

The bearing sleeve 27 insofar permits a certain movement of the adjustment shaft in radial direction with respect to the rotation axis 26 within a certain tolerance. This has the advantage that also the valve element 13 is not fully fixed in radial direction in the valve housing 10. Correspondingly the exhaust gas pressure acting on the valve element 13 when the cross section adjustment element 9 is at least partially closed, can urge the valve element 10 in the direction of one of the bearing shells 14 and 15, in particular in the direction of the bearing shell 14. In this bearing shell a valve seat 30 of the cross section adjustment element 9 is formed. For example at least the bearing shell 14, and preferably also the bearing shell 15, is made of an elastic material.

The bearing shells 14 and 15 can however also be made of a composite material, in particular a metal braid or a metal mesh in which a further material is embedded. Particular preferably this further material can have a solid lubricant, for example graphite or the like. On its side facing away from the valve element 23 the adjustment shaft 23 has a torque transmission element 31. The torque transmission element 31 is for example characterized by a round cross section, in particular a polygonal cross section. For example a drive device of the cross section adjustment element 9 engages on the torque transmission element 31. The drive device can be an electric or pneumatic drive device.

Figure 2:
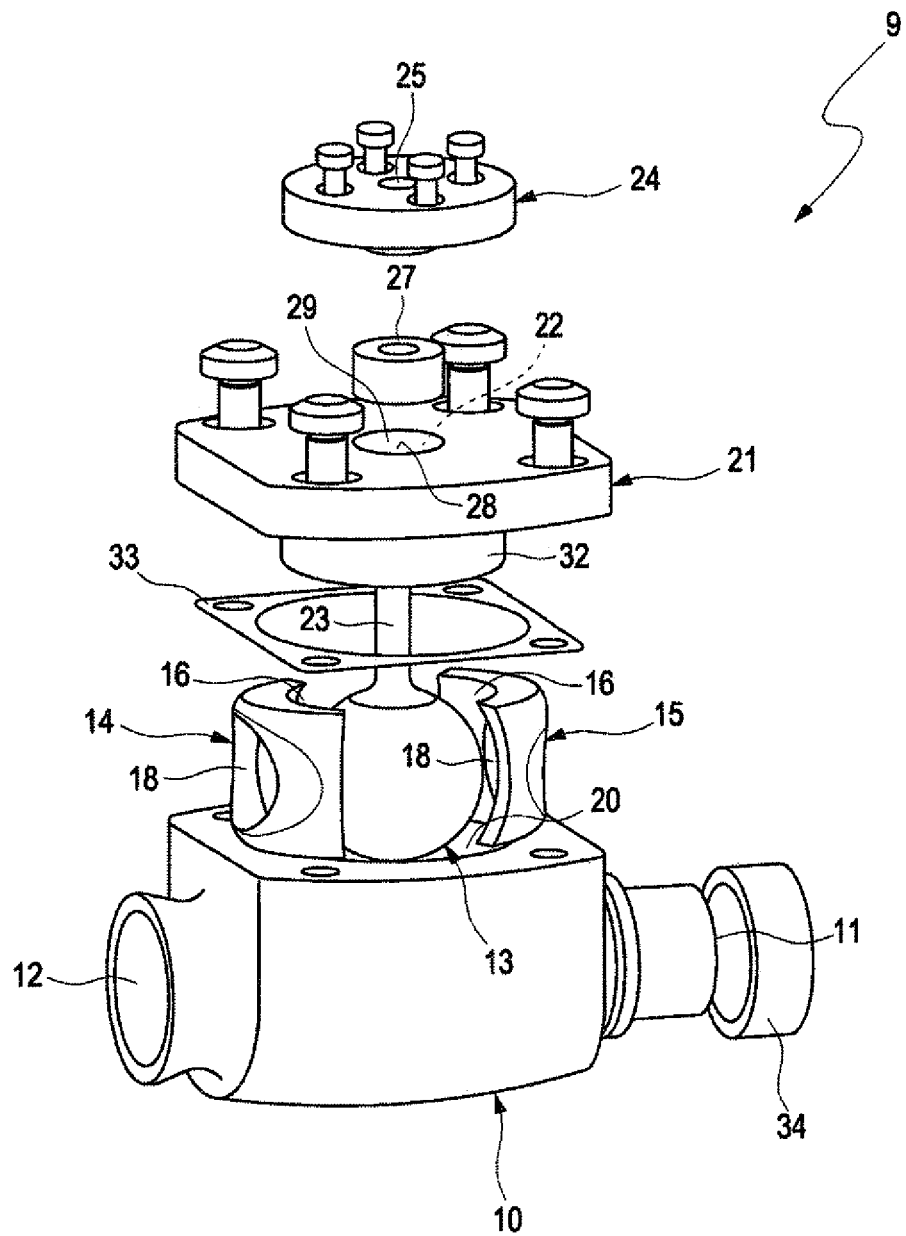

FIG. 2 shows an exploded view of the cross sectional element 9. With regard to the description of the individual elements reference is made to the description above. It can be seen that the lid 21 has at least one holding protrusion 32 which is for example configured hollow cylindrical, in particular hollow circular-cylindrical and after the mounting of the exhaust gas turbocharger 2 engages in the valve housing 10. There the holding protrusion 32 rests against the bearing shells 14 and 15 and urges the bearing shells 14 and 15 into the valve housing 10 or holds them in the valve housing.

Furthermore a sealing 33 is provided between the lid 21 and the valve housing 10, which sealing engages about the entire mounting opening 20 in circumferential direction with respect to the rotation axis 26, pushed onto the valve housing 10 on the side of the flow inlet 11 is a fastening ring 34. With its inner circumference, preferably along the entirety of its inner circumference, the fastening ring 34 contacts the valve housing. With its outer circumference the fastening ring contacts an inner circumference of the bypass line 7 so that the cross section adjustment element 9 is sealingly connected to the bypass line 7. The fastening ring 34 can insofar also be configured as a sealing.

Figure 3:
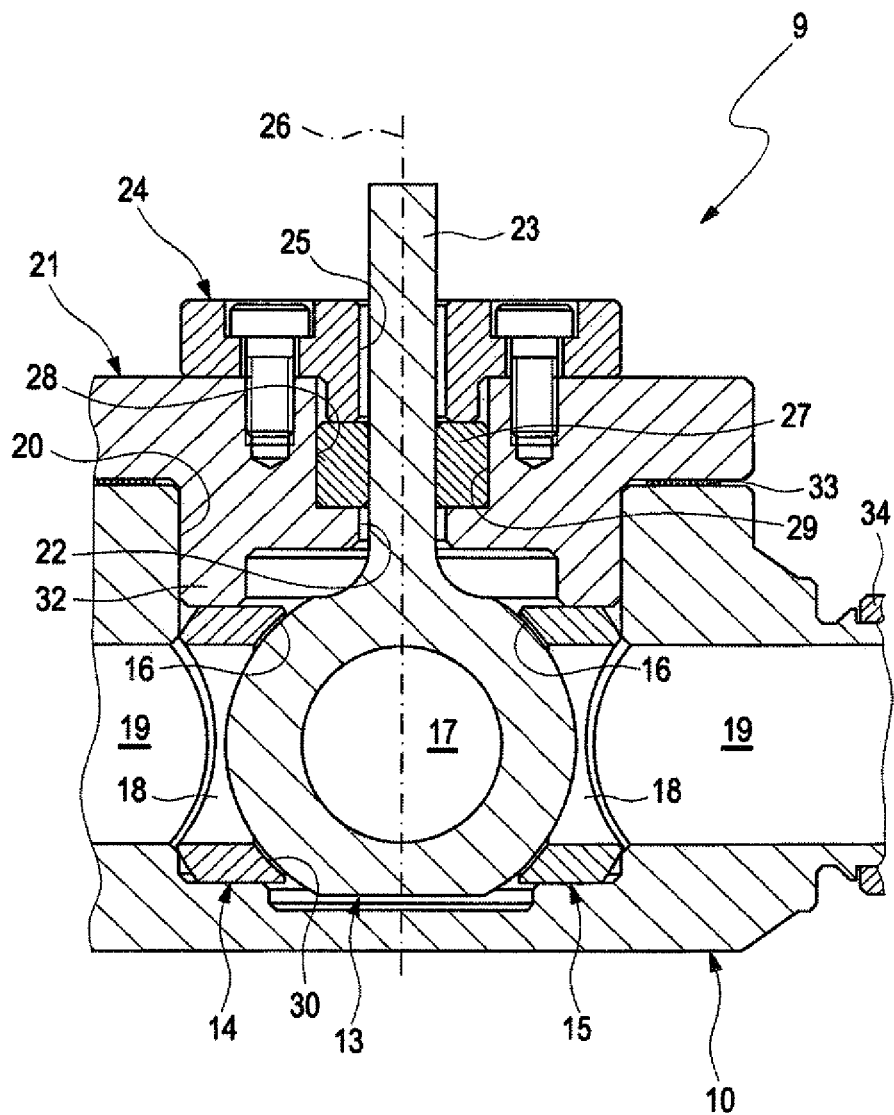

FIG. 3 shows a detail view of the cross section adjustment element 9. it can be clearly seen that the inner diameters of the through openings 22 and 25 are greater than the outer diameter of the adjustment shaft 23. The bearing sleeve 27 on the other hand sealingly contacts the adjustment shaft 23. The lid 21 and/or the bearing element 24 are for example made of a stiff material, in particular metal. In order to not completely fix the adjustment shaft 23 in radial direction with respect to the rotation axis 26 in the valve housing 10 but rather to support the adjustment shaft with a certain tolerance the bearing sleeve 27 is provided which is in particular made of an elastic material.

Figure 4:
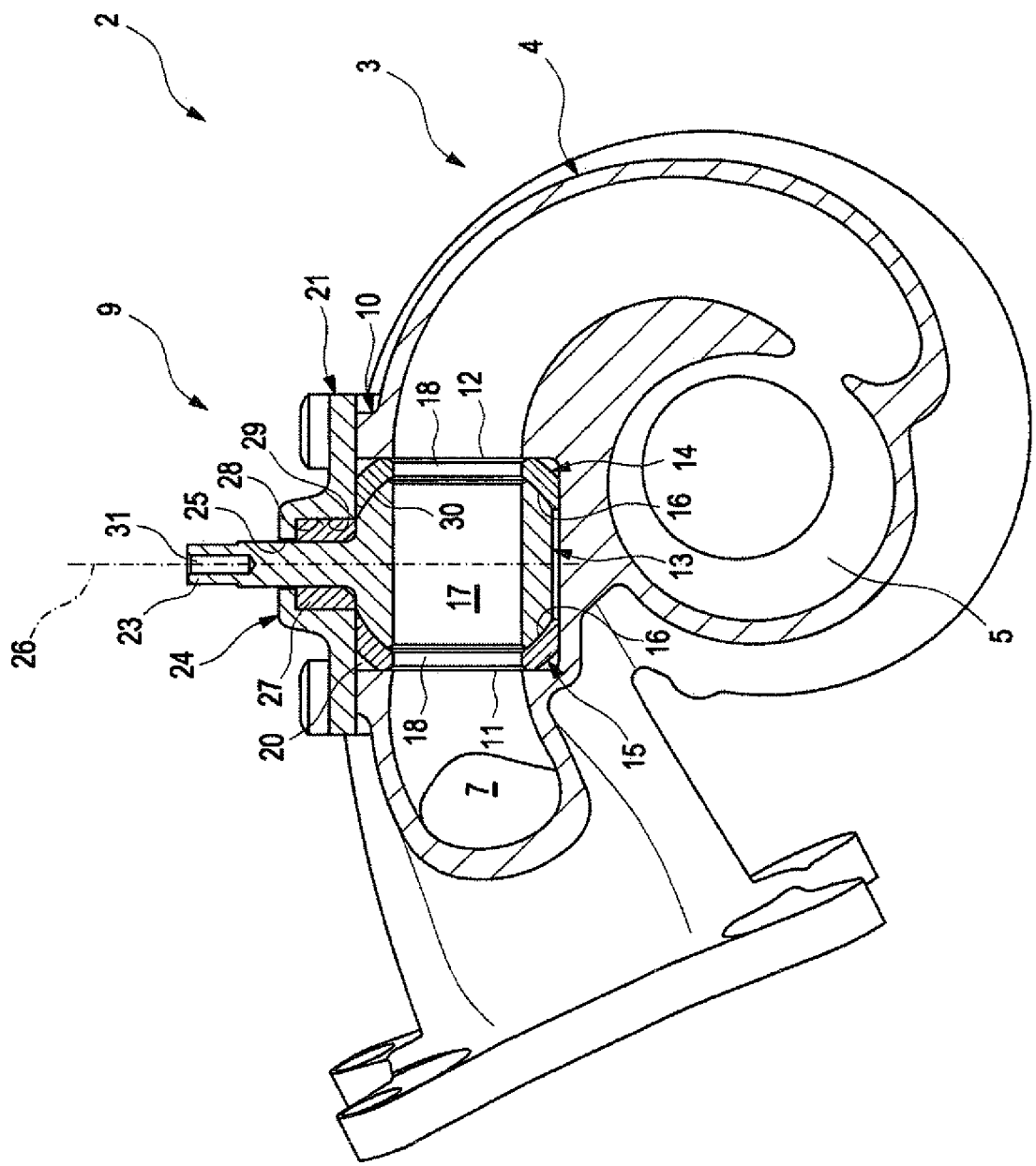

FIG. 4 shows the exhaust gas turbocharger 2 in a further embodiment. This embodiment is generally similar to the already described first embodiment so that reference is made to the description above. The relevant difference to the first embodiment is the integration of the valve housing 10 into the turbine housing 4. In addition the bypass line 7 is also only formed in the turbine housing 4. By means of the bypass line 7 a flow connection between an exhaust gas inlet connection of the turbine housing 4 and the turbine outlet 5 or exhaust gas outlet connection can be generated. In the bypass line 7 the cross section adjustment element 9 is provided by means of which the flow cross section of he bypass line 7 can be adjusted.

The valve element 13 and the bearing shells 14 and 15 are, as explained above, arranged in the valve housing 10 and in the here shown embodiment are thus arranged directly in the turbine housing 4. The turbine housing 4 has for example at least several, in particular all, of the afore-described properties of the valve housing 10. Thus the mounting opening is only directly formed in the turbine housing 4. A further difference to the first embodiment is that the bearing element 24 is configured one-piece with and of the same material as the lid 21. The bearing sleeve 27 is urged by the lid 21 for example in the direction of the valve element 13, in particular onto the valve element 13 so that the bearing sleeve 27 contacts the valve element 13. In the first embodiment the valve element 13 is arranged spaced apart from the bearing sleeve 27. Correspondingly, in contrast to the first embodiment there is no dedicated through opening 22 in the second embodiment which has inner dimensions that are smaller than the outer dimensions of the bearing sleeve 27.

In the second embodiment the torque transmission element 31 can be configured as an inner polygon. The bearing shells 14 and 15 traverse the mounting opening 20 completely or at least almost completely. Correspondingly the holding protrusions 32 of the lid 21 described for the first embodiment are not required. Rather on its side facing the mounting opening 20 the lid 21 can be planar or have a planar surface. This surface contacts the bearing shells 14 and 15 and urges the bearing shells into the turbine housing 4 or holds them in the turbine housing 4.

The invention claimed is:

1. An exhaust gas turbocharger for an internal combustion engine, comprising:
a turbine;
a bypass line fluidly arranged parallel to the turbine; and
a cross section adjustment element for adjusting a flow cross section of the bypass line, said cross section adjustment element being configured as a ball valve having a valve housing, two fixed bearing sheds arranged in the valve housing and a valve element, said valve element being floatingly supported in the valve housing and arranged with a tolerance between the two bearing shells such that the valve element always contacts at most one of the bearing shells while spaced apart from the respective other bearing shell when the cross section adjustment element is at least partial closed and exhaust gas pressure acting on the valve element urges the valve element in a direction of one of the bearing shells or the valve element does not contact either of the bearing shells;
wherein the two bearing shells each have a flow passage with a first flow cross section and a receiving opening into which the valve element partially engages to provide a valve seat when the valve element contacts one of the bearing shells;
wherein the valve element has a flow channel having a second flow cross section which equals the first flow cross section so that in at least one rotary angular position of the valve element, the flow passage of the two bearing shells aligns with the flow channel of the valve element; and
wherein the valve element does not contact either of the bearing shells when there is either no exhaust gas pressure acting on the valve element or the flow passage of the two bearing shells aligns with the flow channel of the valve element.

2. The exhaust gas turbocharger of claim 1, wherein the valve housing has a mounting opening adapted for insertion of the valve element together with the two bearing shells into the valve housing.

3. The exhaust gas turbocharger of claim 2, further comprising a lid closing the mounting opening, said lid having a through opening, and an adjustment shaft operatively connected with the valve element and traversing the through opening.

4. The exhaust gas turbocharger of claim 3, further comprising a bearing element fastened on the lid, said bearing element having a further through opening for receiving the adjustment shaft.

5. The exhaust gas turbocharger of claim 4, wherein at least one of the through opening and the further through opening has an inner diameter which is greater than an outer diameter of the adjustment shaft.

6. The exhaust gas turbocharger of claim 4, further comprising a bearing sleeve arranged between the lid and the bearing element, said bearing sleeve engaging about the adjustment shaft in a circumferential direction.

7. The exhaust gas turbocharger of claim 6, wherein the bearing sleeve is in continuous sealing contact with the adjustment shaft in the circumferential direction.

8. The exhaust gas turbocharger of claim 3, wherein the adjustment shaft is configured in one piece.

9. The exhaust gas turbocharger of claim 3, wherein the adjustment shaft is made of a same material as the valve element.

10. The exhaust gas turbocharger of claim 1, wherein the turbine is connected to an exhaust gas line via a turbine outlet, said exhaust gas line having a cross section which is greater than the valve housing, said valve housing being arranged in the exhaust gas line.

11. The exhaust gas turbocharger of claim 1, wherein the valve housing is integrated in a turbine housing of the turbine.

12. The exhaust gas turbocharger of claim 1, wherein the valve housing has a flow outlet which widens in a direction away from the valve element.

13. A method for producing an exhaust gas turbocharger for an internal combustion engine, said method comprising:
providing a cross section adjustment element configured as a ball valve, said cross section adjustment element being adapted for adjusting a flow cross section of a bypass line of the exhaust gas turbocharger, said bypass line being arranged fluidly parallel to a turbine of the exhaust gas turbocharger;
providing two fixed bearing shells in a valve housing of the cross section adjustment element;
floatingly supporting a valve element in the valve housing; and
arranging the valve element with a tolerance between the two bearing shells such that the valve element always contacts at most one of the bearing shells while spaced apart from the respective other bearing shell when the cross section adjustment element is at least partially closed and exhaust gas pressure acting on the valve element urges the valve element in a direction of one of the bearing shells or the valve element does not contact either of the bearing shells;

wherein the two bearing shells each have a flow passage with a first flow cross section and a receiving opening into which the valve element partially engages to provide a valve seat when the valve element contacts one of the bearing shells;

wherein the valve element has a flow channel having a second flow cross section which equals the first flow cross section so that in at least one rotary angular position of the valve element the flow passage of the two bearing shells aligns with the flow channel of the valve element; and wherein the valve element does not contact either of the bearing shells when there is either no exhaust gas pressure acting on the valve element or the flow passage of the two bearing shells aligns with the flow channel of the valve element.

* * * * *